U. REYNOLDS, dec'd.

G. U. & J. N. REYNOLDS, Executors, and W. S. WARD, Assignee.

Running Gear for Carriages.

No. 9,748. Reissued June 7, 1881.

*Witnesses:*
A. S. Fitch
A. G. Wernily

*William S. Ward*
*Assignee of Inventor:*
*Ul Reynolds*
*by J. P. Fitch*
*Atty*

N. PETERS, Photo-Lithographer, Washington, D. C.

UNITED STATES PATENT OFFICE.

WILLIAM S. WARD, OF NEWARK, NEW JERSEY, ASSIGNEE OF GILBERT U. REYNOLDS AND JOHN N. REYNOLDS, EXECUTORS OF UEL REYNOLDS, DECEASED.

RUNNING-GEAR FOR CARRIAGES.

SPECIFICATION forming part of Reissued Letters Patent No. 9,748, dated June 7, 1881.

Original No. 54,410, dated May 1, 1866. Application for reissue filed April 21, 1881.

*To all whom it may concern:*

Be it known that UEL REYNOLDS, late of the city, county, and State of New York, has heretofore invented and made a certain new and useful Improvement in Running-Gear for Carriages, &c., of which the following is a full, clear, and exact description, reference being had to the annexed drawings, forming part of this specification.

Figure 1:
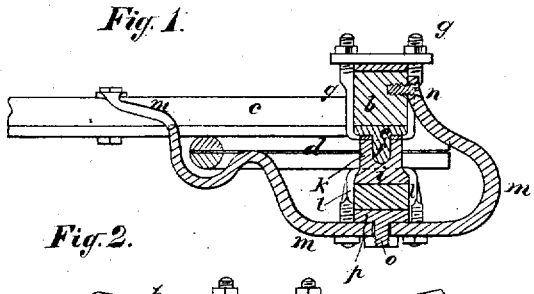
Figure 2:
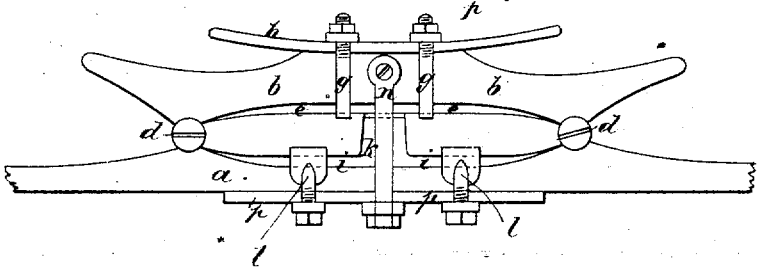

Figure 1 is a sectional view transversely of the axle and bolster, and longitudinally of the brace provided to hold the head-block in position on the axle; and Fig. 2 is a front view of a part of the axle, the head-block, and said brace.

Axles and bolsters or head-blocks of vehicles, as heretofore constructed, being connected by means of a king-bolt passing through both, have depended upon the king-bolt for maintaining the bolster in position upon the axle, the entire strain caused by the backward and forward rocking of the bolster on the axle being taken by the king-bolt, or the connection of the perch on the rear side of the bolster.

By the invention herein described and claimed the bolster is so supported on the axle by a brace that is bolted at one end to the front of the bolster, and then, passing under the axle, is bolted at the opposite end to the perch, that a king-bolt may even be dispensed with.

*m* is a brace which extends below the axle *a*, where it has a hole at the part directly below the bolt *o*, and passes up in front with an outward bend, as shown in Fig. 1, and is connected at *n* to the head-block *b*; or said brace may be attached upon the spring *h* by the center bolt of said spring. It may come up as a fork in front of the axle, so as to be connected to the head-block at two points. After passing under the axle it extends back to the perch, to which it is bolted fast. It is obvious that this brace thus connected with the front of the head-block at one end, and at the other with the perch, and having a connection, also, with the bolt *o* underneath the axle, forms a perfect stay and support to the head-block, to maintain it in an upright position; also, that it so connects the bolster with the axle that if desired the ordinary king-bolt passing entirely through both bolster and axle may be dispensed with by substituting for it a pivot, *f*, projecting from a plate, *e*, below the head-block *b*, into a socket, *k*, in a plate, *i*, attached to the upper side of the axle, at the center thereof.

If preferred, the pivot *f* may be prolonged through the head-block and retained by a nut on its upper end.

The bolt *o*, when a king-bolt passing through the bolster, axle, and brace *m* is not used, may project from a plate, *p*, that is secured by clips *l* to the under side of the axle.

It will be seen that the pivot *f* and socket *k* take the place of the king-bolt, on which the axle may turn.

If preferred, the pivot and socket may be transposed in their position, the socket being attached to the head-block.

What is claimed as the invention of the said UEL REYNOLDS, and desired to be secured by Letters Patent, is—

1. The combination, with the axle, the head-block, and perch of a vehicle, of the brace *m*, extending from the front of the bolster, to which it is bolted underneath the axle, where it is provided with a hole to receive a bolt, to the perch, to which it is secured, as and for the purpose described.

2. The pivot *f* and socket *k*, applied, substantially as specified, between the axle and head-block, in combination with the brace *m* and pivot *o*, substantially as and for the purpose specified.

Witness my hand this 13th day of April, 1881.

WILLIAM S. WARD,
*Assignee of the entire invention of Uel Reynolds.*

In presence of—
A. G. W. VERMILYA,
A. S. FITCH.